United States Patent
Byun (10) Patent No.: US 6,739,635 B2
(45) Date of Patent: May 25, 2004

(54) BUMPER DEVICE FOR AUTOMATED GUIDED VEHICLE

(75) Inventor: Jae-sung Byun, Suwon (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 09/939,697

(22) Filed: Aug. 28, 2001

(65) Prior Publication Data

US 2003/0006619 A1 Jan. 9, 2003

(30) Foreign Application Priority Data

Jul. 6, 2001 (KR) ........................................ 2001-40412

(51) Int. Cl.[7] .......................... B60R 19/28; B61G 11/04
(52) U.S. Cl. ......................... 293/135; 293/25; 293/117
(58) Field of Search ................................. 293/2, 4, 137, 293/24, 25, 26, 102, 117, 126, 131, 135

(56) References Cited

U.S. PATENT DOCUMENTS

| | | | | |
|---|---|---|---|---|
| 2,090,659 A | * | 8/1937 | Zirmer et al. | |
| 2,142,328 A | * | 1/1939 | Mutter | ........................... 293/8 |
| 2,873,994 A | * | 2/1959 | Omps | ......................... 293/134 |
| 3,284,100 A | * | 11/1966 | Goff | |
| 3,664,701 A | | 5/1972 | Kondur | |
| 3,718,332 A | * | 2/1973 | Jones | ......................... 280/735 |
| 3,744,588 A | | 7/1973 | Nave, Sr. | |
| 3,771,824 A | * | 11/1973 | Applegate | ................... 293/131 |
| 3,774,938 A | * | 11/1973 | Orlando | ...................... 280/735 |
| 3,788,666 A | * | 1/1974 | Kramer et al. | ............... 280/739 |
| 3,820,771 A | * | 6/1974 | Kerr et al. | ................... 267/116 |
| 3,840,260 A | * | 10/1974 | Wacker et al. | |
| 3,866,962 A | * | 2/1975 | Eshelman | ..................... 293/19 |
| 4,061,386 A | * | 12/1977 | Chupick | ..................... 293/134 |
| 4,802,548 A | * | 2/1989 | Kausch | |
| 4,807,915 A | * | 2/1989 | Shyi | ........................... 293/132 |
| 4,958,068 A | * | 9/1990 | Pong et al. | |
| 5,213,383 A | * | 5/1993 | Muselli et al. | |
| 5,775,750 A | * | 7/1998 | Gauci et al. | |
| 6,032,992 A | * | 3/2000 | He | |
| 6,217,090 B1 | * | 4/2001 | Berzinji | ...................... 293/132 |

FOREIGN PATENT DOCUMENTS

| | | |
|---|---|---|
| JP | 5-201296 | 8/1993 |
| JP | 7-257299 | 10/1995 |
| KR | 1988-688 | 3/1988 |
| KR | 1991-2927 | 5/1991 |
| KR | 10-253128 | 1/2000 |

* cited by examiner

*Primary Examiner*—D. Glenn Dayoan
*Assistant Examiner*—Patricia L. Engle
(74) *Attorney, Agent, or Firm*—Staas & Halsey LLP (57) ABSTRACT

A bumper device for an Automated Guided Vehicle (AGV) includes a bumper supporting member combined to a vehicle body of the AGV, and a bumper supported on the bumper supporting member. The bumper device also includes a movement supporting device installed at the bumper supporting member and to movably support the bumper, and a movement sensor to sense a movement of the bumper. Thus, the bumper device promptly senses and effectively absorbs an impact from multiple directions.

13 Claims, 9 Drawing Sheets

BUMPER DEVICE FOR AUTOMATED GUIDED VEHICLE

BACKGROUND OF THE INVENTION

1. Field of the Invention

The present invention relates in general to a bumper device for an automated guided vehicle (AGV).

2. Description of the Related Art

An AGV is an apparatus for a factory automation system, for conveying goods, articles, etc. without manipulation by hand in a factory.

The AGV automatically travels along a predetermined path by a controller (not shown) installed therein, and thus the AGV is equipped with a bumper device protecting a vehicle body in preparation for a possible impact on running.

Figure 9:
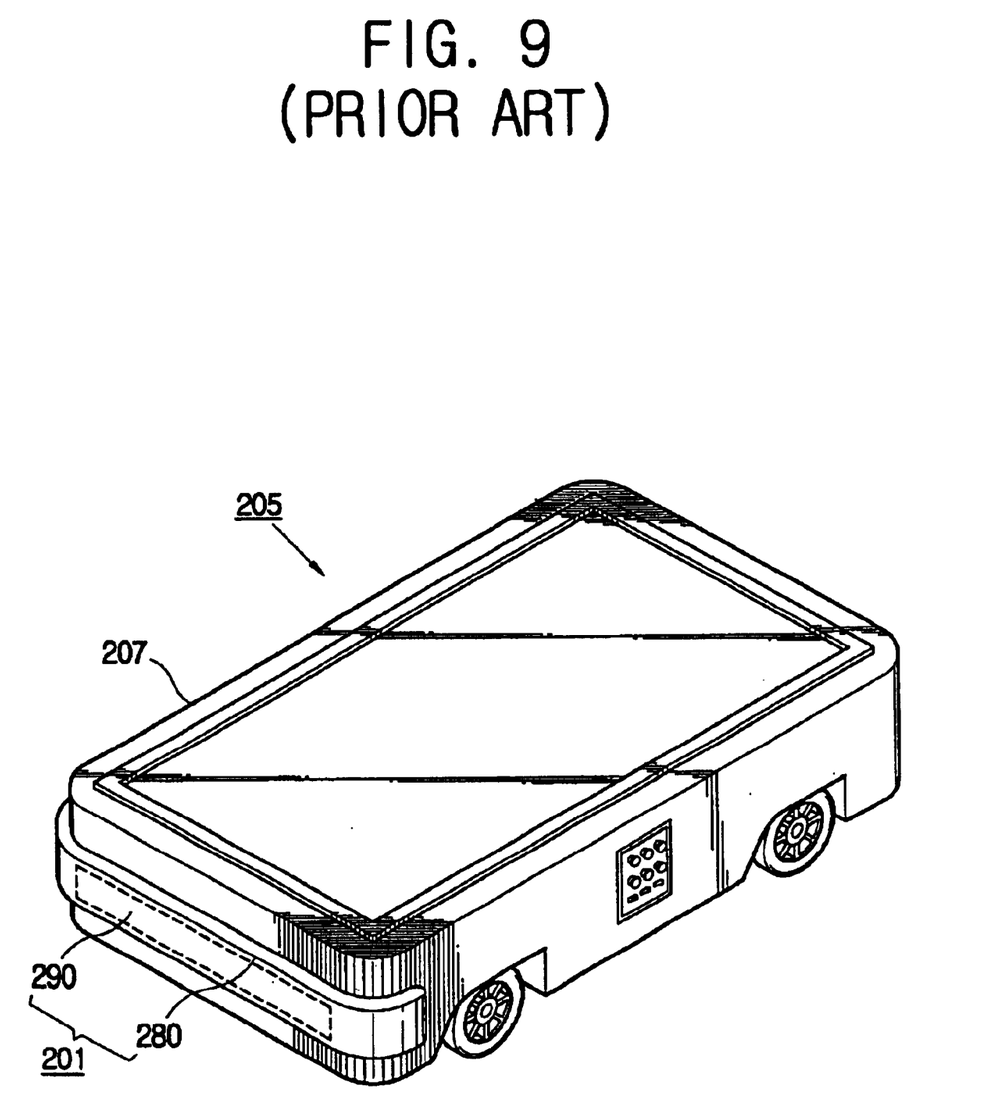
FIG. 9 is a schematic perspective view of a conventional bumper device for an AGV.

A conventional bumper device 201 for an AGV 205, as shown in FIG. 9, comprises a bumper member 280 installed at a circumference of a vehicle body 207, and an impact sensor 290 installed inside the bumper member 280.

The bumper member 280 is made of an elastic material such as rubber, plastics, etc. in order to absorb a shock generated when the AGV 205 impacts on other objects. Further, the impact sensor 290 is of a shape corresponding to the bumper member 280 so as to sense an impact given on the bumper member 280. The impact sensor 290 is installed inside the bumper member 280 by way of an insert molding. Further, the impact sensor 290 is electrically connected to the controller of the AGV 205.

With this configuration, in the conventional bumper device 201, if the AGV 205 impacts on other objects, the bumper member 280 absorbs the impact, and the impact sensor 290 senses the impact transmitted from the bumper member 280 and transmits it to the controller (not shown) of the AGV 205. Then, the controller stops the AGV 205.

However, in the conventional bumper device, because the impact sensor is insert-molded in the bumper member, it is impossible to sense an impact generated beyond a sensing area. That is, there is a problem that the sensing area is limited with respect to regions and direction in which impacts are generated.

In addition, because the impact sensor is insert-molded inside the bumper member, a distance between an impact position and the impact sensor may be not uniform due to a molding tolerance, a dimensional tolerance, or etc., during a manufacturing process thereof. Thus, a sensitivity of the impact sensor may be different according to an impact region of the bumper device.

Moreover, because the bumper member is fixed on the AGV and absorbs an impact with elasticity of the bumper member itself, the bumper device has limitations in an absorbing capability.

SUMMARY OF THE INVENTION

Accordingly, the present invention has been made keeping in mind the above-described shortcoming and user's need, and an object of the present invention is to provide a bumper device for an AGV, which can promptly sense and effectively absorb an impact given from every region and every direction.

This and other objects of the present invention may be accomplished by the provision of a bumper device for an AGV comprising a bumper which absorbs a shock generated in a backward direction of a bumper supporting member combined with a vehicle body of the AGV. The bumper is supported on the bumper supporting member. The bumper device includes a movement supporting means installed at the bumper supporting member to movably support the bumper, and a movement sensor to sense a movement of the bumper.

Preferably, the movement supporting means includes a backward and forward shock absorber.

Effectively, the backward and forward shock absorber is comprised of a guide provided on the bumper supporting member along a backward and forward direction; a supporting slider coupled to the guide so as to slide backward and forward, and supporting the bumper; a backward and forward shock absorbent member installed at the bumper supporting member at the rear of the supporting slider and elastically diminishing a backward movement of the supporting slider.

Preferably, the backward and forward shock absorbent member is comprised of a spring supporter installed at the rear of the guiding slider, and a backward and forward shock absorbent spring held between the spring supporter and the supporting slider.

Effectively, at the spring supporter is installed a spring holding shaft supporting the backward and forward shock absorbent spring; and on the supporting slider is formed a shaft hole through which the spring holding shaft passes.

Preferably, the movement supporting means includes a multi-directional shock absorber installed in front of the supporting slider and absorbing multi-directional shock of the bumper.

Effectively, the multi-directional shock absorber is comprised of a slider connector combined to the supporting slider; a bumper connector combined to the bumper; and a universal joint movably combining the slider connector with the bumper.

Preferably, one end of the bumper connector directly toward the bumper is combined with a rotary shaft perpendicular to a sliding direction of the supporting slider; and on the bumper is provided a rotary shaft accommodating part rotatably combined to the rotary shaft.

Effectively, the bumper is comprised of a bumper plate perpendicular to the guide, and an elastic absorbent member combined on the front of the bumper plate; and the rotary shaft accommodating part is provided on the rear of the bumper plate.

Preferably, the bumper device further comprises a multi-directional shock absorbent spring surrounding the multi-directional shock absorber between the supporting slider and the bumper and absorbing the shock of impact on the bumper.

Effectively, the movement sensor includes a sensor plate combined to the bumper and having a sensing hole thereon; a light element emitting light passing through the sensing hole; and a light receiving element sensing the light passed through the sensing hole from the light element.

Preferably, the bumper device further comprises a droop preventive unit having one end combined to the bumper supporting member and the other end contacting with a rear lower part of the bumper, in order to prevent the bumper from drooping.

Effectively, the droop preventive unit is comprised of a hollow plunger-accommodating member combined to the bumper supporting member; a plunger spring accommodated in the plunger-accommodating member; and a plunger accommodated in the plunger-accommodating member and contacting with a rear lower part of the bumper by elasticity of the plunger spring.

Preferably, the movement supporting means is provided in pairs at opposite sides of the bumper plate.

BRIEF DESCRIPTION OF THE DRAWINGS

The present invention will be better understood and its various objects and advantages will be more fully appreciated from the following description taken in conjunction with the accompanying drawings, in which.

DETAILED DESCRIPTION OF THE PREFERRED EMBODIMENT

A preferred embodiment of the present invention will be described in more detail with reference to the accompanying drawings.

Figure 1:
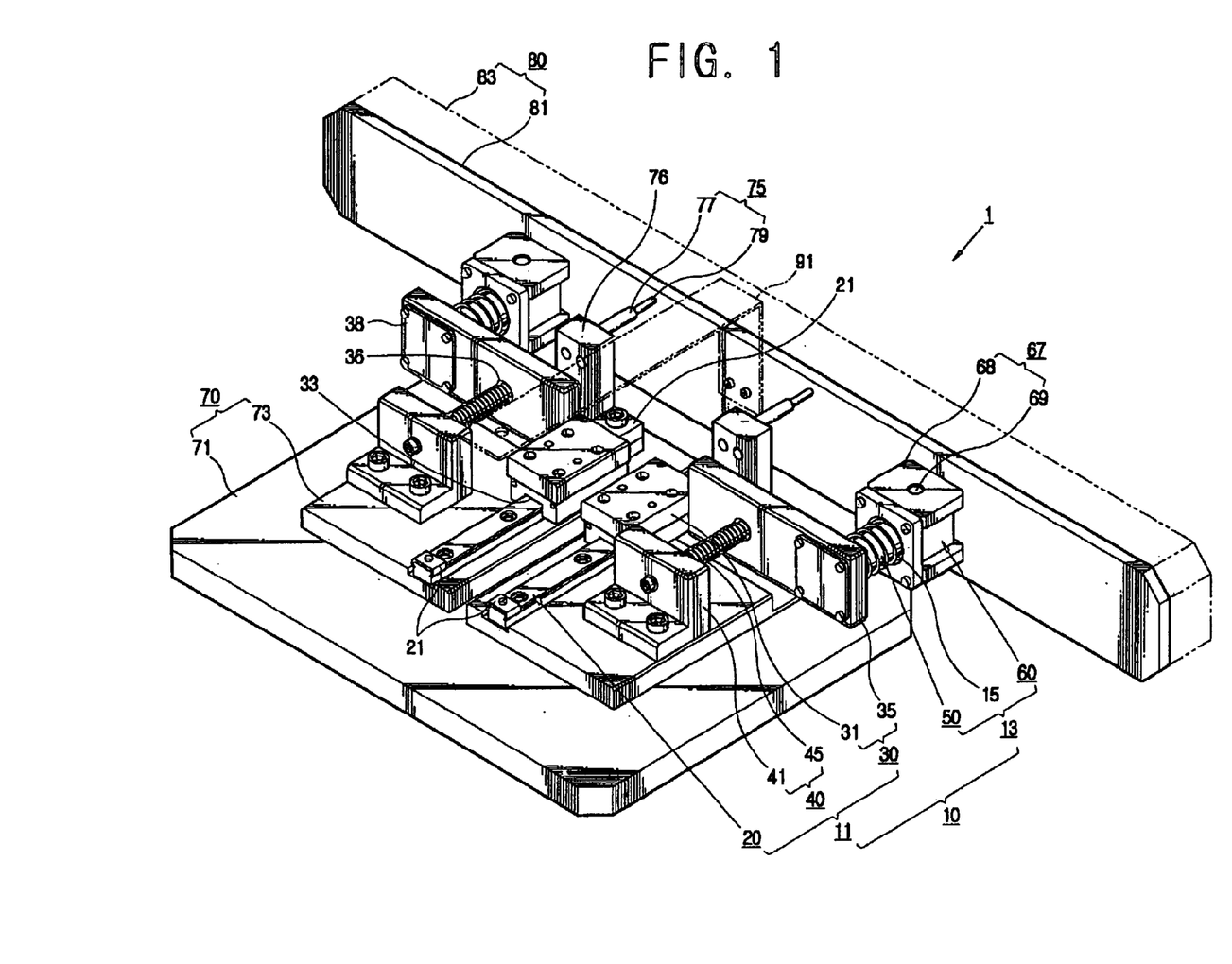
FIG. 1 is a perspective view of a bumper device for an AGV according to a first embodiment of the present invention.

FIG. 1 is a perspective view of a bumper device for an AGV according to a first embodiment of the present invention. As shown therein, the bumper device 1 for the AGV comprises a bumper supporting member 70 combined to a vehicle body 7 of the AGV 5 (see FIG. 7), a bumper 80 movably combined to the bumper supporting member 70, a movement sensor 90 (see FIG. 4) sensing a movement of the bumper 80, and at least one movable supporting means 10 installed on the bumper supporting member 70 and movably supporting the bumper 80.

The bumper supporting member 70 includes a combining plate 71 combined to a bottom part of the vehicle body 7 of the AGV 5, and a guiding plate 73 provided on the combining plate 71 and forming a mounting plate on which the movable supporting means 10 are installed. The combining plate 71 is of a rectangular shape with a predetermined area. The combining plate 71 is combined to the bottom part of the vehicle body 7 by means of bolts, welding, or etc. Further, the guiding plate 73 has an enough area to install the movable supporting means 10 thereon. Here, it is desirable that the combining plate 71 and the guiding plate 73 are manufactured separately and then combined to each other.

The bumper 80 includes a bumper plate 81 provided in parallel with a side of the vehicle body 7 of the AGV 5, and an elastic absorbent member 83 combined to the front of the bumper plate 81.

The bumper plate 81 is approximately of a rectangular shape having a predetermined width and a length corresponding to the length of the side of the vehicle body. The absorbent member 83 is made of an elastic material such as rubber, plastics, etc. in order to absorb a shock generated when the AGV 5 impacts on other objects. In this case, it is desirable that the absorbent member 83 should have an enough elasticity to absorb the shock and transmit it to the bumper plate 81.

Figure 4:
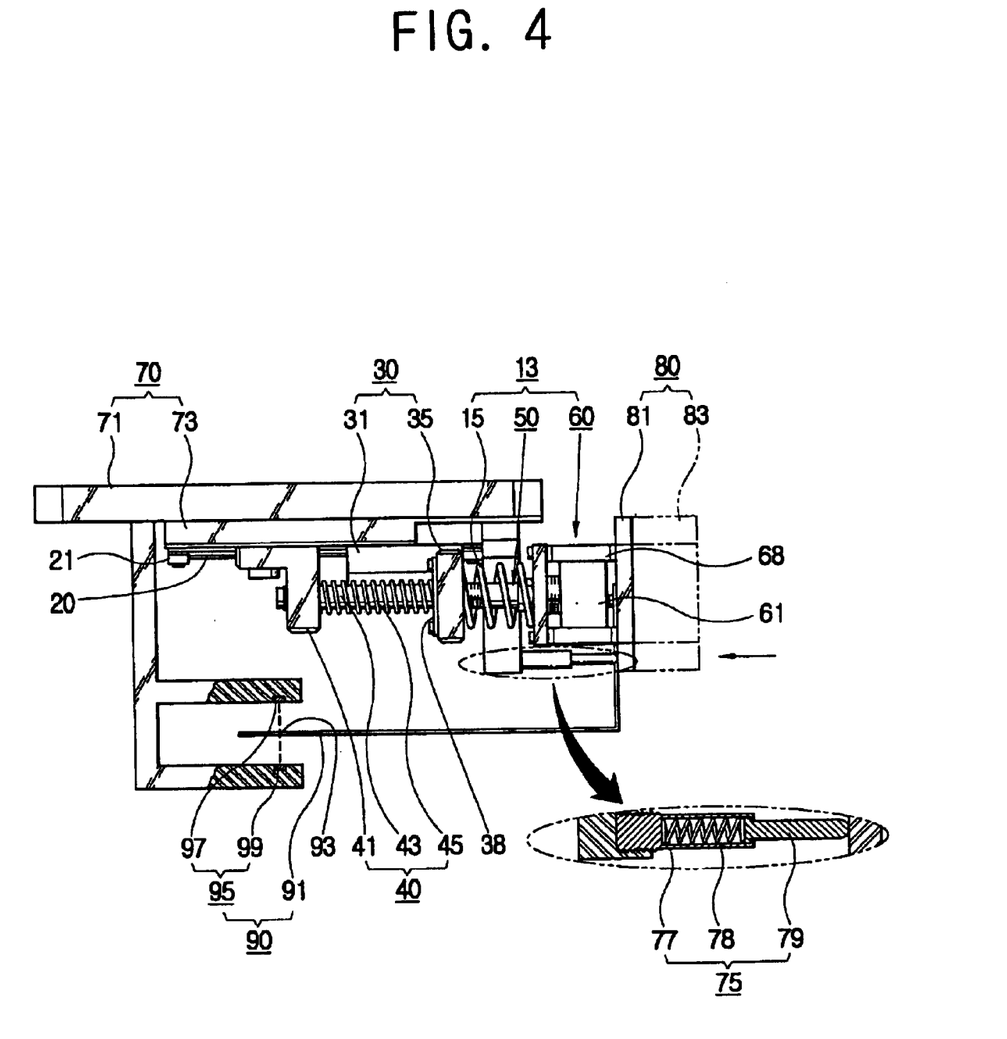
FIGS. 4 and 5 are side views showing actions of the bumper device for the AGV of FIG. 1.
Figure 5:
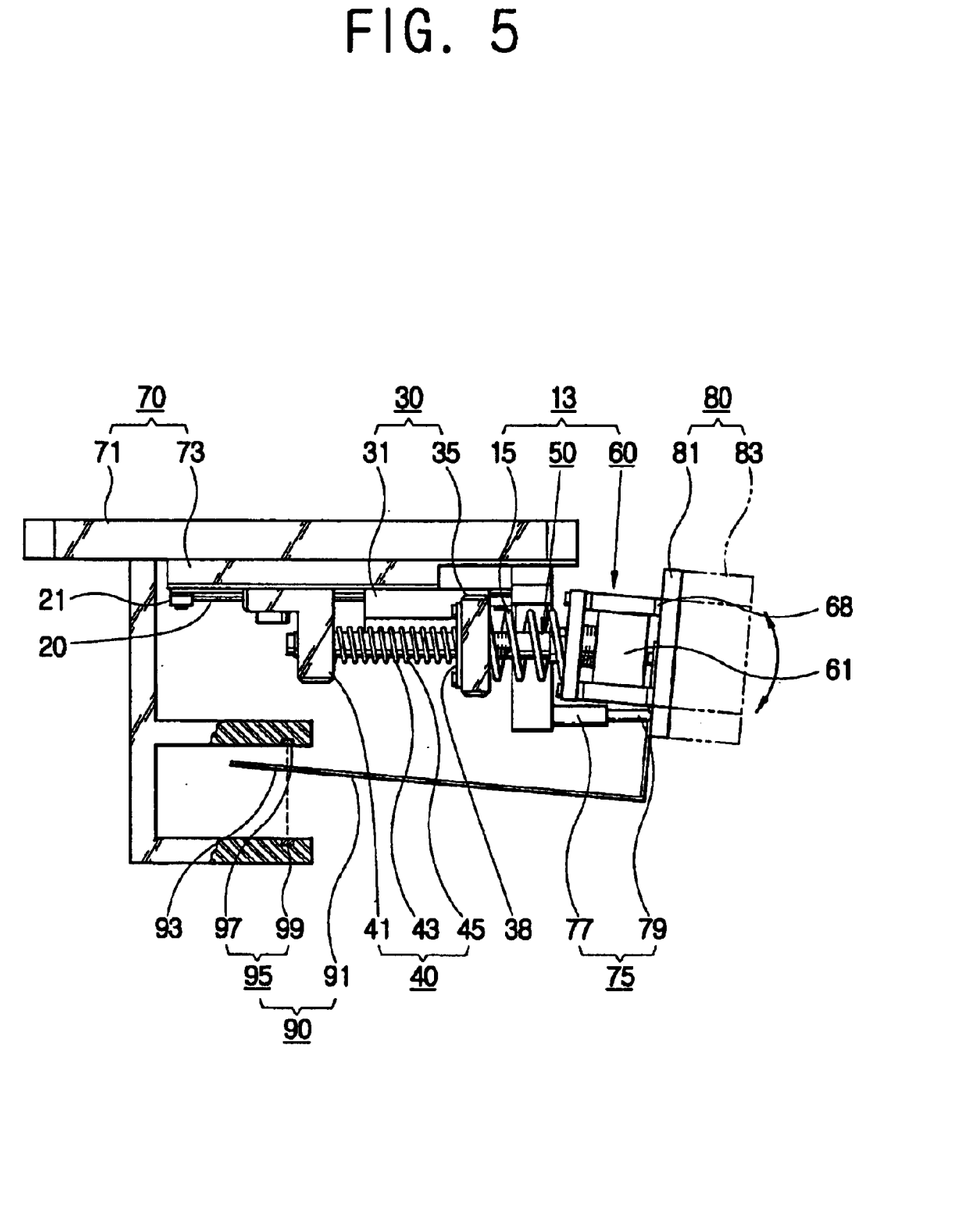

The movement sensor 90, as shown in FIGS. 4 and 5, includes a sensor plate 91 having one end combined to the bumper plate 81 and the other end backwardly extended from the bumper plate 81, and an optical sensor 95 installed at the bumper supporting member 70 and sensing the movement of the sensor plate 91. At a rear part of the sensor plate 91 is formed a sensing hole 93. The optical sensor 95 is comprised of a light element 97 emitting light passing through the sensing hole 93 and a light receiving element 99 sensing the light passed through the sensing hole 93, the sensor plate 91 being positioned therebetween. The optical sensor 95 is electrically connected to a controller (not shown) controlling an operation of the AGV 5. Thus, where the sensor plate 91, together with the sensing hole 93, moves depending on an impact of the bumper 80, light from the light element 97 is not transmitted to the light receiving element 99, and which is transmitted it to the controller (not shown) of the AGV 5.

The movable supporting means 10 includes a backward and forward directional shocks absorber 11 installed on the bumper supporting member 70 and absorbing backward and forward directional shocks from the bumper 80, and a multi-directional shock absorber 13 installed between the backward and forward shock absorber 11 and the bumper 80 and absorbing multi-directional shocks from the bumper 80.

The backward and forward shock absorber 11 is comprised of a guide 20 provided on the guiding plate 73 along a backward and forward direction, a supporting slider 30 sliding backward and forward along the guide 20, a backward and forward shock absorbent member 40 installed at the rear part of the supporting slider 30 and elastically diminishing a backward movement of the supporting slider 30.

The guide 20 may be manufactured separately and then combined to the guiding plate 73, or may be manufactured in one united body. Opposite end parts of the guide 20 are provided with stoppers 21 preventing the supporting slider 30 from separating from the guide 20.

The supporting slider 30 is comprised of a sliding part 31 sliding along the guide 20, and a supporting part 35 extended from a part of the sliding part 31, perpendicular to the guide 20.

On a surface of the sliding part 31, which faces the guide 20, is formed a guiding groove 33 for engaging with the guide 20. It is desirable that the guide 20 and the guiding groove 33 are combined to each other in a dovetail manner so as to prevent the sliding part 31 from coming off the guide 20.

On an area of the supporting part 35, which is adjacent to the guide 20 is provided a shaft hole 36 through which a spring holding shaft 43 of the backward and forward shock absorbent member 40 passes. Further, on a free end of the supporting part 35 is provided a movable unit hole 37 (see FIG. 6) to which the multi-directional shock absorber 13 is combined. The movable unit hole 37 is formed with a female screw 39 on the inside thereof, and is covered by a cover plate 38 at the rear part of the supporting part 35.

The backward and forward shock absorbent member 40 is comprised of a spring supporter 41 installed on the guiding plate 73, and a backward and forward directional shock absorbent spring 45 held between the spring supporter 41 and the supporting part 35 of the supporting slider 30.

Figure 2:
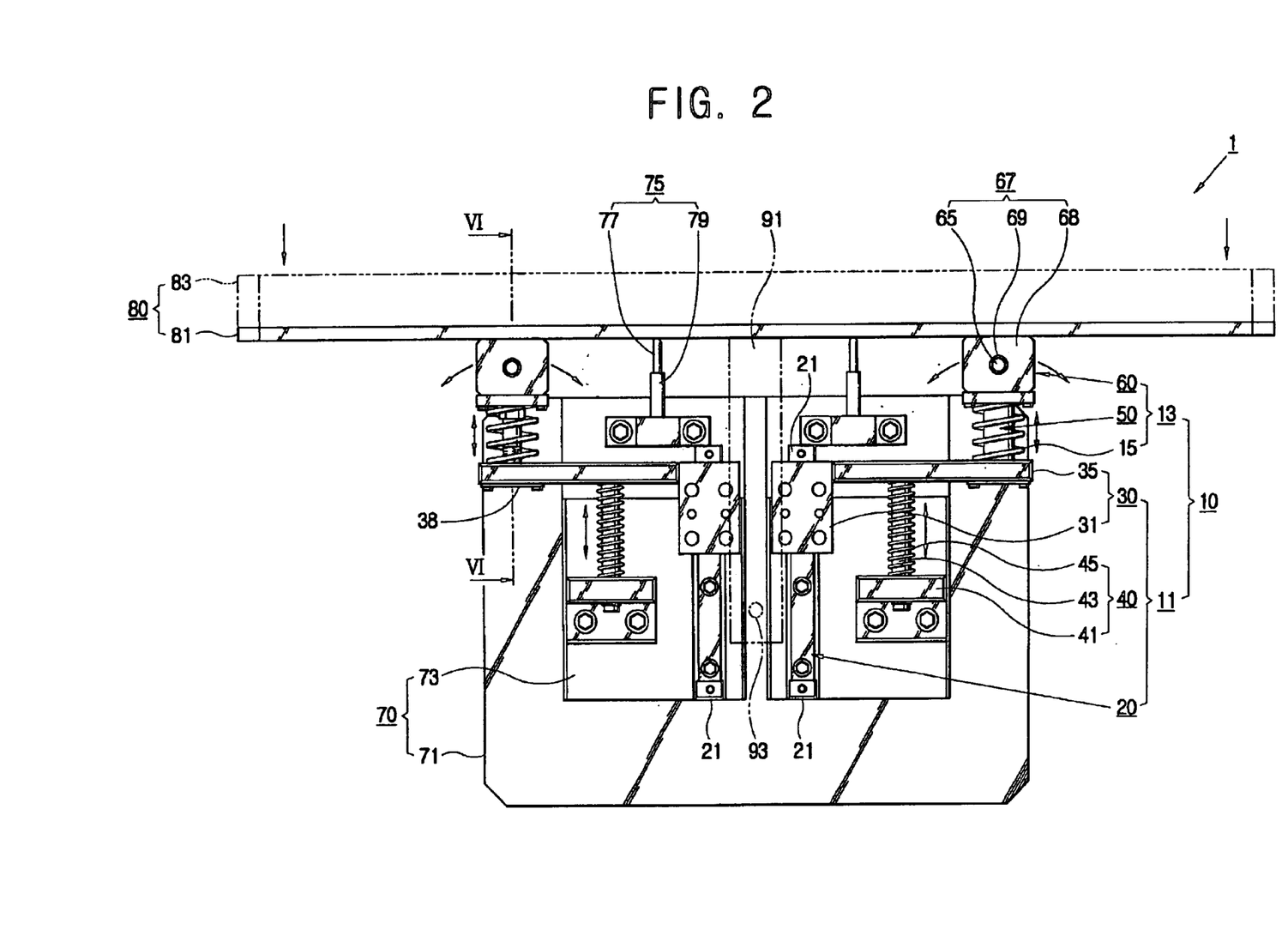
FIGS. 2 and 3 are a top plan views showing actions of the bumper device for the AGV of FIG. 1.

The spring supporter 41 is standing on the guiding plate 73. The front of the spring supporter 41 is combined with the spring holding shaft 43 (see FIGS. 2 and 4) whose free end passes through the shaft hole 36 provided on the supporting part 35 of the supporting slider 30. Further, the backward and forward shock absorbent spring 45 surrounds the spring holding shaft 43.

The multi-directional shock absorber 13 is comprised of a movement supporting unit 50 supporting an up and down movement and a lateral movement of the bumper 80, a rotary supporting unit 60 supporting a rotational movement of the bumper 80 in forward and backward directions, and a multi-directional shock absorbent spring 15 diminishing the movement of the bumper 80.

Figure 6:
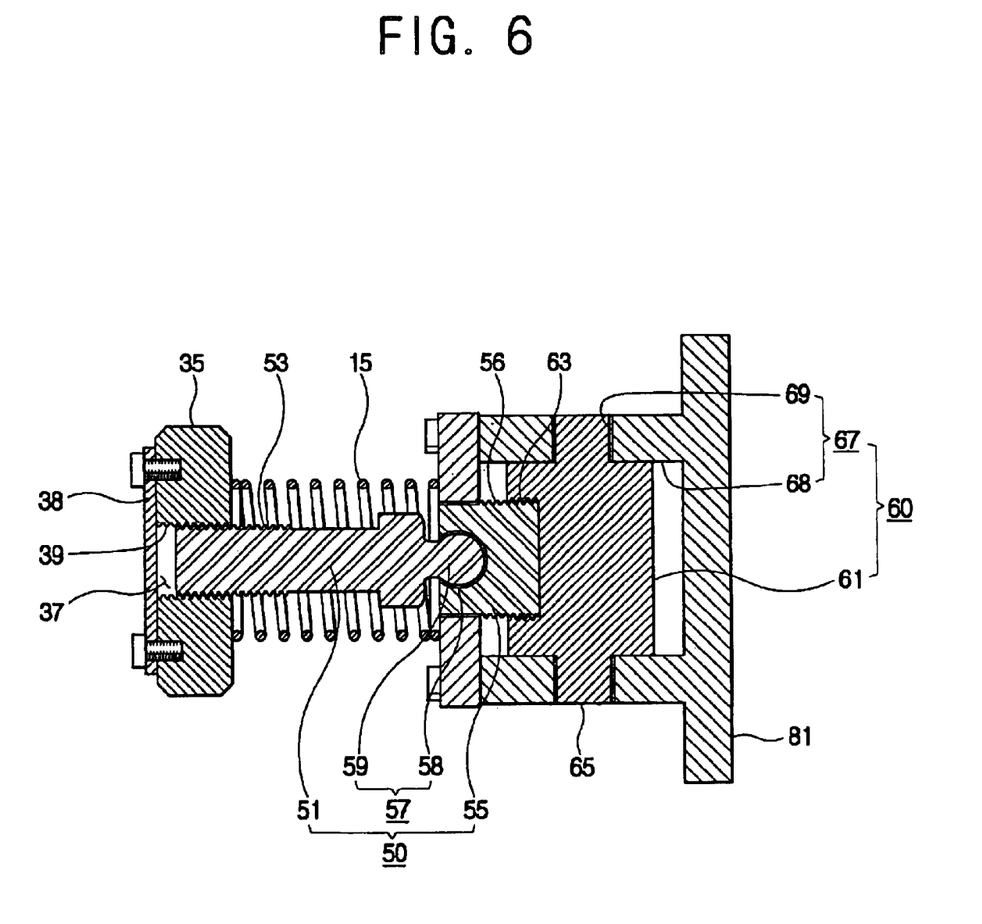
FIG. 6 is a section view showing a part taken along line VI—VI of FIG. 2.

The movement supporting unit 50 is, as shown in FIG. 6, comprised of a slider connector 51 combined to the movable unit hole 37 of the supporting slider 30, a bumper connector 55 combined to the bumper 80, and a universal joint 57 provided between the slider connector 51 and the bumper connector 55 and movably combining the slider connector 51 with the bumper connector 55.

On a rear part of the slider connector 51 is formed a male screw 53 corresponding to the female screw 39 formed on the movable unit hole 37. The universal joint 57 is comprised of a bail accommodating part 58 formed at a free end of the 51 bumper connector 55, and a ball 59 integrally formed at the rear part of the slider connector 51 and being movably accommodated in the ball accommodating part 58. Here, the positions of the ball accommodating part 58 and the ball 59 may be changed with respect to each other. Further, the ball accommodating part 58 and the ball 59 may be manufactured separately from the bumper connector 55 and the slider connector 51, respectively, and then combined with each connector. On the free end of the bumper connector 55 is formed a male screw 56.

The rotary supporting unit 60 is, as shown in FIG. 6, comprised of a rotary shaft 61 combined to the free end of the bumper connector 55, a rotary shaft accommodating part 67 provided at the rear part of the bumper plate 81 and rotatably combined with the rotary shaft 61.

On a backward center of the rotary shaft 61 is formed a female screw 63 corresponding to the male screw 56 of the bumper connector 55. On up and down parts of the rotary shaft 61 are provided projections 65 for combining with the rotary shaft accommodating part 67.

The rotary shaft accommodating parts 67 are provided at both sides on the rear of the bumper plate 81. Each rotary shaft accommodating part 67 has a pair of combining plates 68 parallel to each other and protruded from the rear up and down parts of the bumper plate 81. On the center of each combining plate 68 is provided a rotary shaft hole 69 through which the projection 65 of the rotary shaft 61 is rotatably inserted.

The multi-directional shock absorbent spring 15 is installed between the supporting part 35 of the supporting slider 30 and the rotary shaft accommodating part 67 of the bumper 80 so as to surround the movement supporting unit 50.

In addition, the bumper device 1 for the AGV 5 according to the present invention further comprises a droop preventive unit 75 for preventing the bumper 80 from drooping. As shown in FIGS. 4 and 5, the droop preventive unit 75 includes a hollow plunger-accommodating member 77 combined to the bumper supporting member 70, a plunger spring 78 accommodated in the plunger-accommodating member 77, and a plunger 79 accommodated in the plunger-accommodating member 77 and contacting with the rear of the bumper 80 by elasticity of the plunger spring 78. The rear end of the plunger-accommodating member 77 is combined to a supporter 76 provided on the bumper supporting member 70. The droop preventive unit 75 allows the plunger 79 to elastically push the lower part of the bumper 80, thereby preventing the bumper 80 from drooping due to a self-weight thereof.

Figure 7:
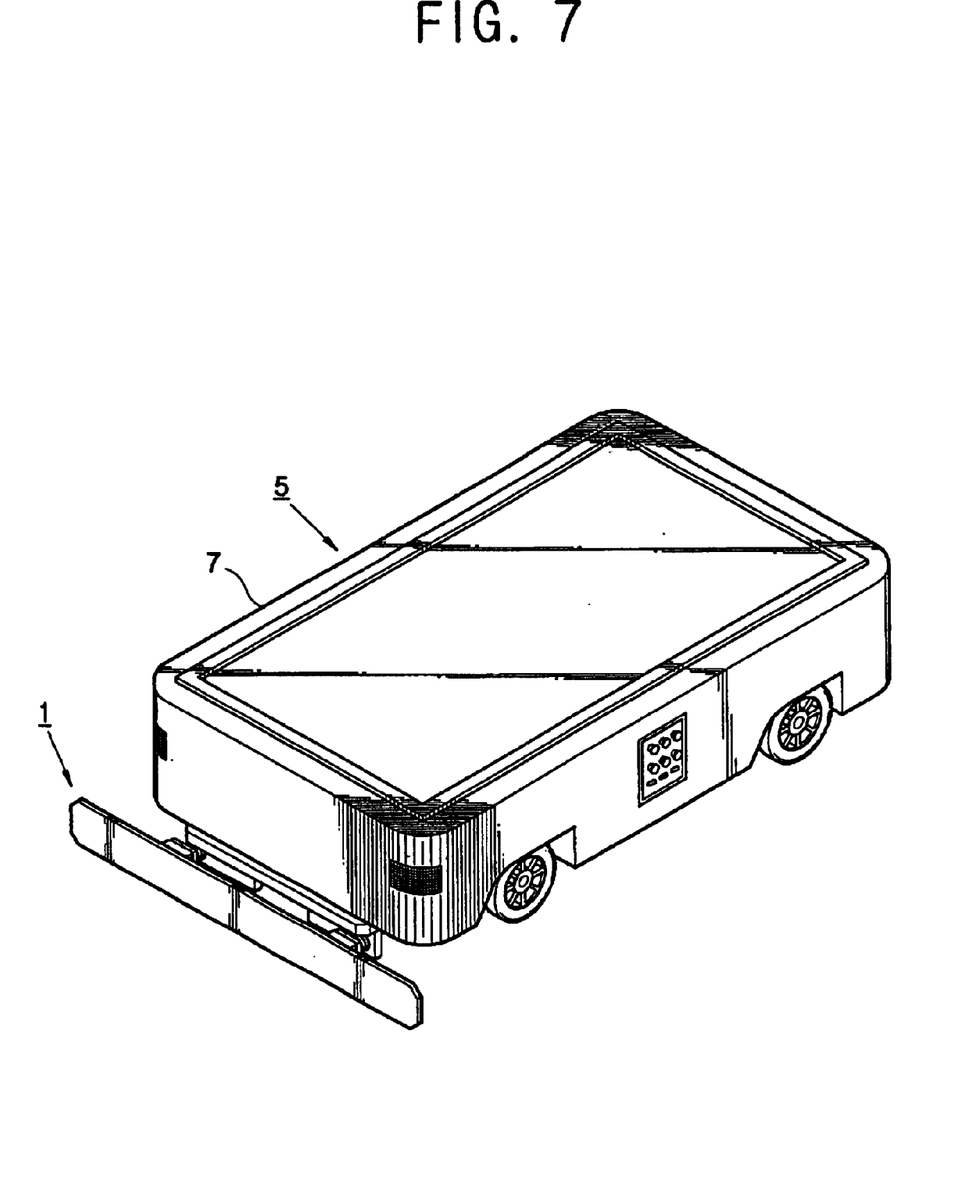
FIG. 7 is a perspective view showing the AGV equipped with the bumper device of FIG. 1.

With this configuration, the bumper device 1 for the AGV 5 according to the present invention is, as shown in FIG. 7, combined with the lower part of the vehicle body 7 of the AGV 5, and absorbs and senses the shock of impact, thereby stopping the AGV 5. Herein, the bumper device 1 may be installed at on at least one side of the vehicle body 7.

Hereinbelow, an operation of the bumper device 1 for the AGV will be described.

Figure 3:
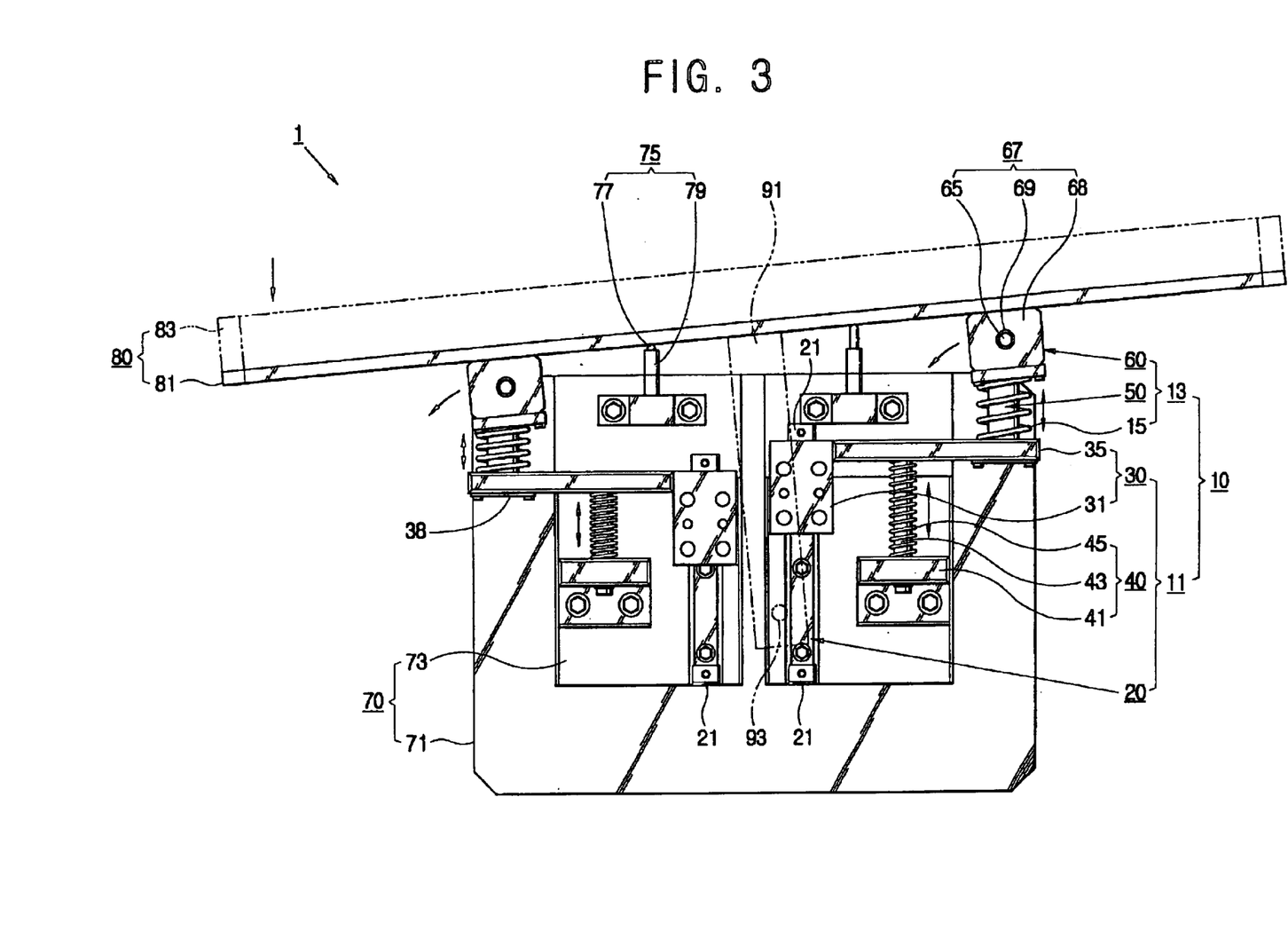

While the AGV 5 is traveling, if the bumper 80 impacts other objects, firstly, the shock of impact is absorbed in the elastic absorbent member 83 of the bumper 80 and makes the bumper plate 81 move. At this time, as shown in FIG. 3, if the impact region is the left part or the right part of the bumper 80, the bumper plate 81 turns around the rotary shaft 61 of the rotary supporting unit 60 and moves back at one universal joint 57 of the movement supporting unit 50. As shown in FIG. 5, if the impact region is the upper part or the lower part of the bumper 80, the bumper plate 81 moves from up to down at the universal joints 57 of the movement supporting unit 50.

If the bumper plate 81 moves, secondly, the shock of impact is absorbed in the multi-directional shock absorbent spring 15. Thereafter, the shock of impact, which is not absorbed by the absorbent member 83 and the multi-directional shock absorbent spring 15 is absorbed by making the supporting slider 30 move back along the guide 20, and therefore the backward and forward shock absorbent spring 45 completely absorbs the shock of impact.

Further, if the bumper plate 81 moves depending on an impact on the bumper 80, the movement sensor 90 senses the movement of the bumper plate 81 and transmits it to the controller (not shown) of the AGV 5, while the shock of impact is absorbed in the absorbent member 83, the backward and forward shock absorber 11, and the multi-directional shock absorber 13.

That is, if the bumper plate 81 moves, the sensor plate 91 combined to the bumper plate 81 moves, and therefore the sensing hole 93 moves. Then, the light being transmitted from the light element 97 to the light receiving element 99 is swerved from the sensing hole 93 due to the movement of the sensor plate 91. That is, the light from the light element 97 cannot pass through the sensing hole 93, and therefore does not reach the light receiving element 99. Then, the movement sensor 90 transmits an impact signal to the controller (not shown) of the AGV 5, and the controller stops the AGV 5.

Figure 8:
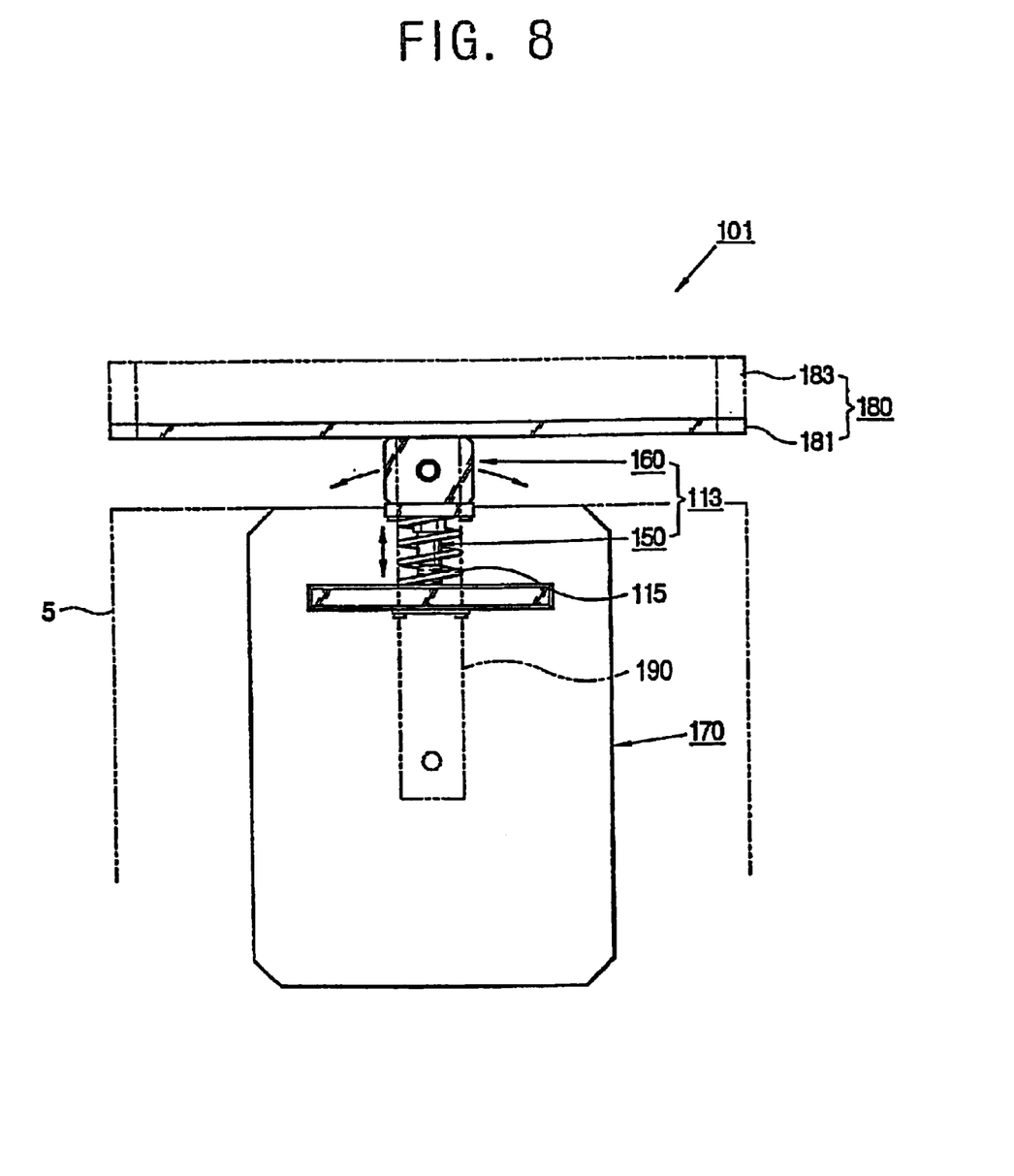
FIG. 8 is a top plan view of a bumper device for an AGV according to a second embodiment of the present invention.

FIG. 8 is a top plan view of a bumper device for an AGV 5 according to a second embodiment of the present invention. As shown therein, unlike the bumper device 1 of FIG. 1, the bumper device 101 for the AGV 5 according to the second embodiment comprises a single multi-directional shock absorber 113 as a movable supporting means.

The multi-directional shock absorber 113 is comprised of a movement supporting unit 150 combined with a bumper supporting member 170 and supporting an up and down movement and a lateral movement of the bumper 180, a rotary supporting unit 160 supporting a rotational movement of the bumper 180 in forward and backward directions, and a multi-directional shock absorbent spring 115 diminishing a movement of the bumper 180.

The movement supporting unit 150, the rotary supporting unit 160, the multi-directional shock absorbent spring 115, and a movement sensor 190 are the same as those of the bumper device 1 of FIG. 1 according to the first embodiment. Therefore, the descriptions for the first embodiment will be incorporated herein.

With this configuration, in the bumper device 101 according to the second embodiment, if the bumper 180 impacts on other objects while the AGV 5 is traveling, firstly, the shock of impact is absorbed in an elastic absorbent member 183 of the bumper 180 and makes the bumper plate 181 move along the impact direction. That is, if the bumper 180 impacts on other objects, the bumper plate 181 moves along a direction according to the movement supporting unit 150 or the rotary supporting unit 160. Then, if the bumper plate 181 moves, secondly, the shock of impact is absorbed in the multi-directional shock absorbent spring 115.

Further, if the bumper plate 181 moves according to impact of the bumper 180, the movement sensor 190 senses the movement of the bumper plate 181 and transmits it to the controller (not shown) of the AGV 5, while the shock of impact is absorbed in the absorbent member 183 and the multi-directional shock absorber 113. Then, the movement sensor 190 transmits an impact signal to the controller so as to stop the AGV 5. Because a sensing operation of the movement sensor 190 is the same as that of the bumper device 1 of FIG. 1, detailed descriptions thereof will be omitted.

As described above, a bumper absorbing a shock is movably installed and a movement sensor sensing a movement of the bumper is provided, so that the shock of impact in every region and every direction on a bumper can be promptly sensed.

Moreover, the sensitivity thereof is improved because the movement sensor senses the movement of a bumper plate, and an absorbing function of a bumper device is improved because the shock is absorbed by the movement of the bumper.

As described above, the present invention provides a bumper device for an AGV, which can promptly sense and effectively absorb a shock of impact in every area and every direction.

Although the preferred embodiments of the present invention have been disclosed for illustrative purpose, those skilled in the art will appreciate that various modifications, additions and substitutions are possible, without departing from the scope and spirit of the invention as disclosed in the accompanying claims.

What is claimed is:

1. A bumper device for an Automated Guided Vehicle (AGV) including a bumper supporting member combined to a vehicle body of the AGV, and a bumper movably combined with the bumper supporting member, comprising:
    a movement supporting device installed at the bumper supporting member, and including a backward and forward shock absorber to absorb back and forward directional shocks from the bumper and a multi-direction shock absorber to absorb multi-directional shock of the bumper; and
    a movement sensor to sense a movement of the bumper.
2. The bumper device according to claim 1, wherein the backward and forward shock absorber comprises:
    a guide provided on the bumper supporting member along a backward and forward direction;
    a supporting slider coupled to the guide to slide backward and forward, and support the bumper; and
    a backward and forward shock absorbent member installed at the bumper supporting member at the rear of the supporting slider to elastically diminish a backward movement of the supporting slider.
3. The bumper device according to claim 2, wherein the backward and forward shock absorbent member comprises:
    a spring supporter installed at the rear of the supporting slider; and
    a backward and forward shock absorbent spring held between the spring supporter and the supporting slider.
4. The bumper device according to claim 3, further comprising:
    a spring holding shaft installed at the spring supporter to support the backward and forward shock absorbent spring; and
    a shaft hole formed on the supporting slider, through which the spring holding shaft passes.
5. The bumper device according to claim 2, wherein the multi- directional shock absorber comprises:
    a movement supporting unit including:
        a slider connector combined with the supporting slider;
        a bumper connector combined with the bumper; and
        a universal joint to movably combine the slider connector with the bumper.
6. The bumper device according to claim 5, further comprising:
    a rotary shaft perpendicular to a sliding direction of the supporting slider, and combined with the bumper connector positioned directly toward the bumper; and
    a rotary shaft accommodating part provided on the bumper and rotatably combined with the rotary shaft.
7. The bumper device according to claim 5, wherein the bumper comprises:
    a bumper plate perpendicular to the guide; and
    an elastic absorbent member combined with a front of the bumper plate, wherein the rotary shaft accommodating part is provided on the rear of the bumper plate.
8. The bumper device according to claim 5, further comprising:
    a multi-directional shock absorbent spring to surround the multi-directional shock absorber between the supporting slider and the bumper, and to absorb a shock of impact on the bumper.
9. The bumper device according to claim 1, wherein the movement sensor comprises:
    a sensor plate combined with the bumper and having a sensing hole thereon;
    a light element to emit light passing through the sensing hole; and
    a light receiving element to sense the light passed through the sensing hole from the light element.
10. The bumper device according to claim 1, further comprising:
    a droop preventive unit having one end combined with the bumper supporting member and the other end contacting with a rear lower part of the bumper to prevent the bumper from drooping.
11. The bumper device according to claim 10, wherein the droop preventive unit comprises:
    a hollow plunger-accommodating member combined with the bumper supporting member,
    a plunger spring accommodated in the plunger-accommodating member; and
    a plunger accommodated in the plunger-accommodating member to contact with a rear lower part of the bumper by elasticity of the plunger spring.

12. The bumper device according to claim 1, wherein the movement supporting device is provided in pairs at opposite sides of the bumper.

13. A bumper device for an Automated Guided Vehicle (AGV), comprising:
- a bumper supporting member combined with a vehicle body of the AGV;
- a bumper movably combined with the bumper supporting member;
- a movement supporting device installed at the bumper supporting member, and including a backward and forward shock absorber to absorb back and forward directional shocks from the bumper and a multi-direction shock absorber to absorb multi-directional shock of the bumper; and
- a movement sensor to sense a movement of the bumper.

* * * * *